US009473549B2

(12) United States Patent
Chen et al.

(10) Patent No.: US 9,473,549 B2
(45) Date of Patent: Oct. 18, 2016

(54) METHOD OF PLAYING INTERNET VIDEO AND RELATED ELECTRONIC DEVICE

(71) Applicant: Wistron Corporation, New Taipei (TW)

(72) Inventors: Li-Hsuan Chen, New Taipei (TW); Po-Hsu Chen, New Taipei (TW); Hui-Liang Chang, New Taipei (TW)

(73) Assignee: Wistron Corporation, New Taipei (TW)

( * ) Notice: Subject to any disclaimer, the term of this patent is extended or adjusted under 35 U.S.C. 154(b) by 380 days.

(21) Appl. No.: 13/938,253

(22) Filed: Jul. 10, 2013

(65) Prior Publication Data

US 2014/0068013 A1    Mar. 6, 2014

(30) Foreign Application Priority Data

Sep. 4, 2012   (TW) .............................. 101132211 A (51) Int. Cl.
*H04L 29/06*   (2006.01)

(52) U.S. Cl.
CPC .............. *H04L 65/60* (2013.01); *H04L 65/604* (2013.01); *H04L 65/4084* (2013.01); *H04L 65/607* (2013.01)

(58) Field of Classification Search
CPC .............. H04L 65/601; H04L 65/403; H04N 21/6373; G06F 3/04842
See application file for complete search history.

(56) References Cited

U.S. PATENT DOCUMENTS

| | | | | |
|---|---|---|---|---|
| 2008/0144711 A1* | 6/2008 | Chui | ..................... | H04N 19/159 375/240.01 |
| 2008/0271095 A1* | 10/2008 | Shafton | .............. | H04N 7/17318 725/87 |
| 2011/0082914 A1* | 4/2011 | Robert | ................ | H04N 21/4788 709/219 |
| 2011/0238789 A1 | 9/2011 | Luby | | |
| 2012/0005365 A1 | 1/2012 | Ma | | |
| 2012/0070129 A1* | 3/2012 | Lin | ................. | H04N 21/234327 386/278 |
| 2012/0102184 A1* | 4/2012 | Candelore | ........... | H04N 21/4728 709/224 |
| 2012/0110628 A1* | 5/2012 | Candelore | ....... | H04N 21/234327 725/110 |
| 2012/0195372 A1* | 8/2012 | Zhai | ....................... | H04N 19/61 375/240.03 |
| 2012/0222065 A1 | 8/2012 | Prins | | |
| 2013/0219073 A1* | 8/2013 | Dong | .................... | H04L 65/605 709/231 |
| 2013/0259442 A1* | 10/2013 | Bloch | ............... | H04N 21/23439 386/230 |

FOREIGN PATENT DOCUMENTS

| | | |
|---|---|---|
| CN | 102149005 A | 8/2011 |
| TW | I339067 | 3/2011 |

OTHER PUBLICATIONS

Office action mailed on Jul. 31, 2015 for the Taiwan application No. 101132211, filed: Sep. 4, 2012, p. 2-11 and p. 12 line 1-2.
Office action mailed/issued on May 27, 2016 for CN application No. 201210350277.8, p. 3 line 4-45, p. 4 and p. 5 line 1-13.

\* cited by examiner

*Primary Examiner* — Nicholas Taylor
*Assistant Examiner* — Sanjoy Roy
(74) *Attorney, Agent, or Firm* — Winston Hsu; Scott Margo (57) ABSTRACT

A method of playing an internet video for an electronic device is disclosed. The method includes receiving data associated with the internet video from a network, wherein the video data includes information of a highest resolution and a lowest resolution of the internet video; determining a first display resolution range according to a network bandwidth utilized by the electronic device; and selecting a first resolution for playing the internet video according to the first display resolution range and whether the electronic device has stored a complete data associated with the internet video with the highest resolution.

19 Claims, 11 Drawing Sheets

FIG. 1

| Resolution | Bandwidth |
|---|---|
| 240p | 32KB/s |
| 360p | 64KB/s |
| 480p | 128KB/s |
| 720p | 371KB/s |
| 1080p | 550KB/s |
| 2160p | 1024KB/s |

METHOD OF PLAYING INTERNET VIDEO AND RELATED ELECTRONIC DEVICE

BACKGROUND

1. Field

The present disclosure relates to a method of playing an internet video and a device, and more particularly, to a method of playing a high quality internet video and its related electronic device.

2. Description of the Prior Art broadband network advances, real time video transmission has become a popular application on the Internet. Web television (TV) is a system for transmitting television signals via a broadband network, for broadcasting programs through the network protocols of the broadband network to transmit digital television services to subscribers. The web TV service suppliers usually provide related services simultaneously, such as Internet connection, IP connecting call, etc. The web TV is a kind of digital TV; hence an ordinary television is required to be equipped with a corresponding digital set-top box for receiving the channels, in order to provide video-on-demand (VOD) services for the users. With consideration of timing, the VOD services can be classified into two categories: "a live broadcasting video", which the timing of uploading images to the network is simultaneous with an on-going event, such as programs with uncertain lengths (i.e. live broadcasting of a web TV station, internet broadcasting by relay, etc) and "a general internet video", which have been fully stored in database for downloading after the event, such as video resources with fixed lengths are provided on websites, e.g. YouTube, Vimeo, etc.

A user may experience that the conventional TV program is played immediately after the user switches the channel, but in view of a network-based TV, the videos of TV programs are downloaded from the network and then played, which may cause a time lag. Please note that, the playing of the live broadcasting video and the general internet video resources are both limited to bandwidth of the network. For example, when playing the general internet video, the user can determine a desired resolution for the playing. However, the bandwidth may not be sufficient for playing the video with the selected resolution, such that the user needs to wait for the video playing until the video buffer data is enough. In addition, the video buffer data may be used up during the playing, and thereby the video is paused for further data buffering, causing video discontinuity to the user during video watching.

In order to solve the discontinuity of playing the video when the user switches the channel, most of the information provided by current digital TVs are fetched by a digital set-top box in advance or provided by TV stations as uniform images (e.g. poster images, etc.). As to a video program, the preview contents displayed based on this method are not lively and rich enough, such that the user cannot immediately understand the contents to determine whether to keep watching when the preview videos are displayed.

SUMMARY OF THE DISCLOSURE

Therefore, the present disclosure provides a method of playing an internet video, in order to solve the above problem.

The present disclosure discloses a method of playing an internet video for an electronic device. The method comprises receiving data associated with the internet video from a network, the video data comprising information of a highest resolution and a lowest resolution of the internet video; determining a first display resolution range according to a network bandwidth utilized by the electronic device; and selecting a first resolution for playing the internet video according to the first display resolution range and whether the electronic device has stored a complete data associated with the internet video with the highest resolution.

The present disclosure further discloses a video processing device for an electronic device capable of playing an internet video. The video processing device comprises a communication interface unit, for receiving video data associated with the internet video from a network, the video data comprising information of a highest resolution and a lowest resolution of the internet video; a checking unit, for determining a first display resolution range according to a network bandwidth utilized by the electronic device; and a processing unit, for selecting a first resolution for playing the video data according to the first display resolution range and whether the electronic device has stored a complete data associated with the internet video with the highest resolution.

The present disclosure further discloses an electronic device for playing an internet video. The electronic device comprises a storage unit, for storing video data; and a video processing device, for processing the internet video in advance. The video processing device comprises a communication interface unit, for receiving video data associated with the internet video from a network, the video data comprising information of a highest resolution and a lowest resolution of the internet video; a checking unit, for determining a first display resolution range according to a network bandwidth utilized by the electronic device; and a processing unit, for selecting a first resolution for playing the video data according to the first display resolution range and whether the electronic device has stored a complete video data with the highest resolution.

These and other objectives of the present disclosure will no doubt become obvious to those of ordinary skill in the art after reading the following detailed description of the preferred embodiment that is illustrated in the various figures and drawings.

DETAILED DESCRIPTION

Figure 1:
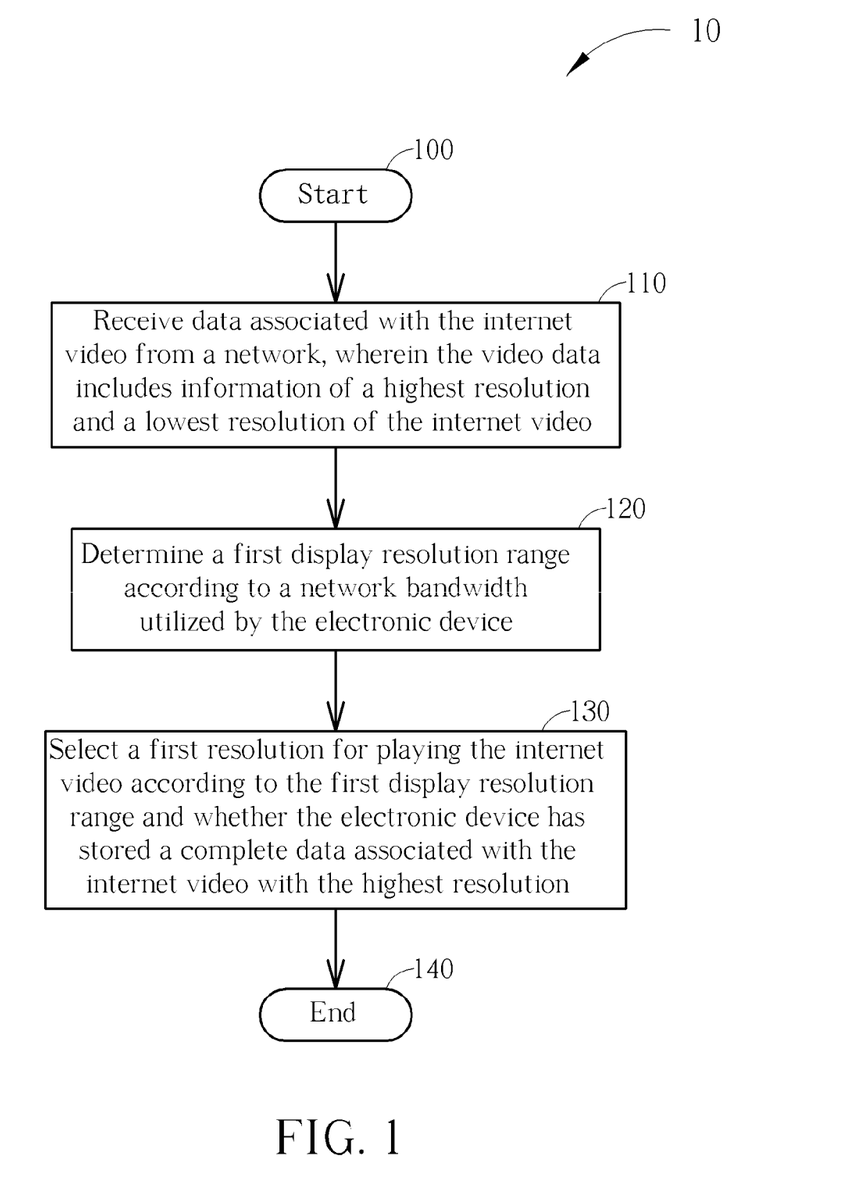
FIG. 1 is a schematic diagram of a video playing process according to an embodiment of the present disclosure.

In order to avoid the video playing delay on the web TV due to channel switch, the present disclosure provides a video playing method, such that the user experiences seamless program playing like on the conventional TV during channel switch. Please refer to FIG. 1, which is a schematic diagram of a video playing process 10 according to an embodiment of the present disclosure. The video playing process 10 is utilized in an electronic device, which is a device capable of receiving network services and having video playing functions. The electronic device can be an internet protocol TV (IPTV), a computer, a mobile phone, etc., which are not limited herein. The video playing process 10 includes the following steps:

Step 100: Start.

Step 110: Receive data associated with the internet video from a network, wherein the video data includes information of a highest resolution and a lowest resolution of the internet video.

Step 120: Determine a first display resolution range according to a network bandwidth utilized by the electronic device.

Step 130: Select a first resolution for playing the internet video according to the first display resolution range and whether the electronic device has stored a complete data associated with the internet video with the highest resolution.

Step 140: End.

According to the video playing process 10, after receiving the data associated with the internet video, the electronic device may determine the display resolution range according to the network bandwidth currently utilized. In addition, the electronic device may consider whether it has stored the complete data associated with the internet video with the highest resolution and the display resolution range according to the network bandwidth as a basis for selecting the resolution for playing the internet video. For example, if the electronic device has stored the complete data associated with the internet video with the highest resolution, the electronic device may select the highest resolution of the internet video for playing the internet video; if the electronic device has not stored the complete data associated with the internet video with the highest resolution, e.g. if the electronic device has only stored partial data associated with the internet video or has not stored any data associated with the internet video, the electronic device may select a proper resolution among the display resolution range supported by the network bandwidth to play the internet video.

Furthermore, if the maximum resolution among the display resolution range supported by the network bandwidth is less than the lowest resolution of the internet video, the electronic device may select the lowest resolution of the internet video to play the internet video. In addition, when the resolution value for playing the internet video selected by the electronic device is less than the maximum resolution among the display resolution range, the electronic device can utilize a remaining bandwidth of the network for downloading the video data with the highest resolution in advance. The pre-downloading video data with the highest resolution can be stored in the electronic device; hence after the electronic device pre-downloads enough video data, the electronic device can directly play the stored video data with the highest resolution. In short, the embodiment of the present disclosure can automatically determine a proper resolution for playing the internet video (the proper resolution can be a resolution value between the minimum resolution of the internet video and the maximum resolution among the display resolution range supported by the network bandwidth), in order to avoid the discontinuity occurs when the internet video is played due to insufficient bandwidth. In addition, the embodiment of the present disclosure can utilize the remaining bandwidth for downloading the high quality internet video in advance, in order to provide the high quality internet video for the follow-up playing.

Figure 2:
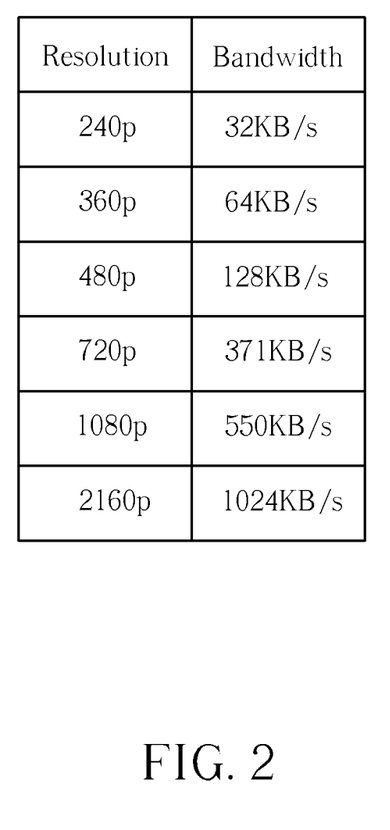
FIG. 2 is a schematic diagram of the resolution of a YouTube video corresponding to the bandwidth according to an embodiment of the present disclosure.
Figure 3A:
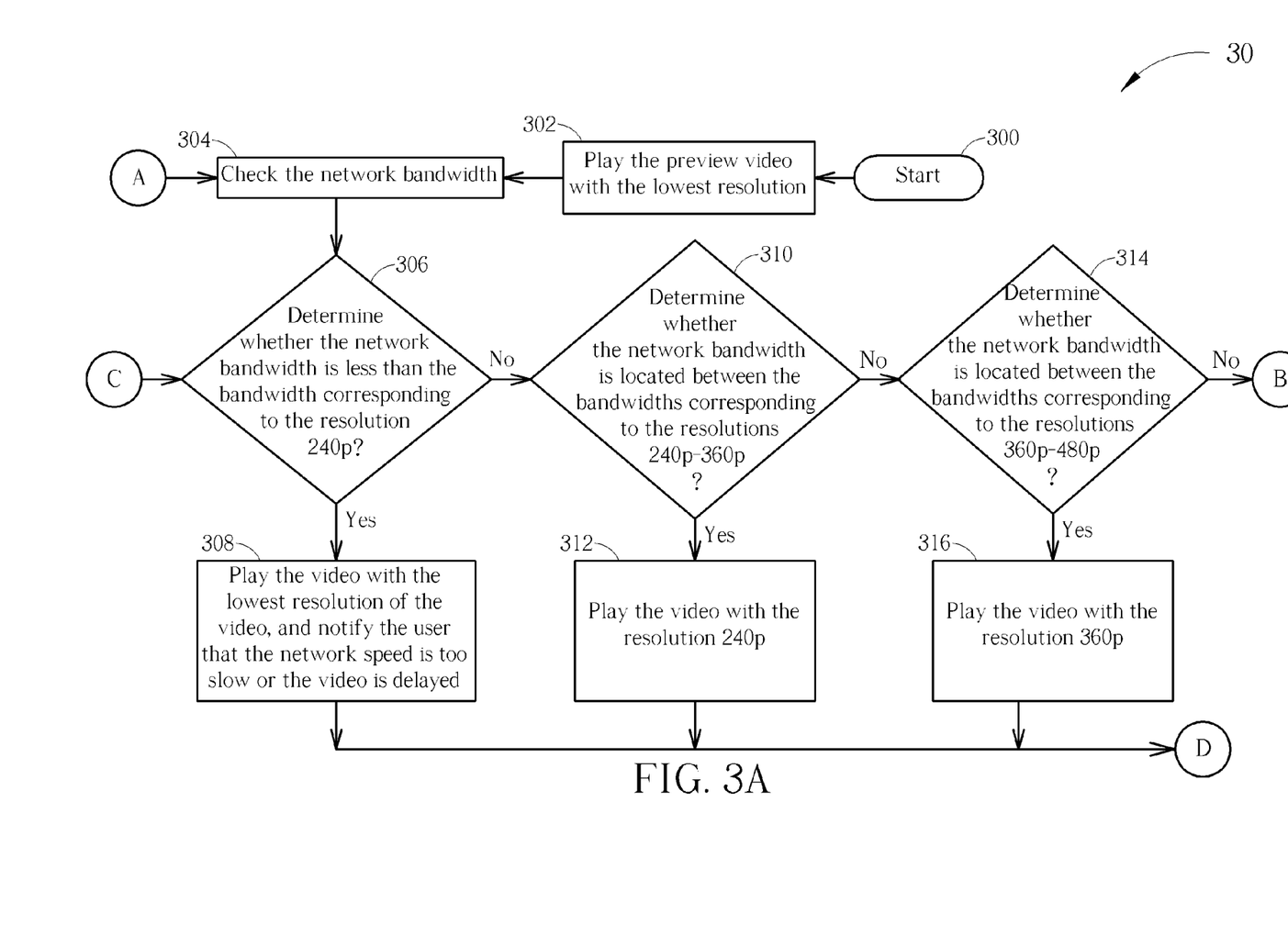
FIG. 3A and FIG. 3B are schematic diagrams of a video playing process of the live broadcasting video according to an embodiment of the present disclosure.
Figure 3B:
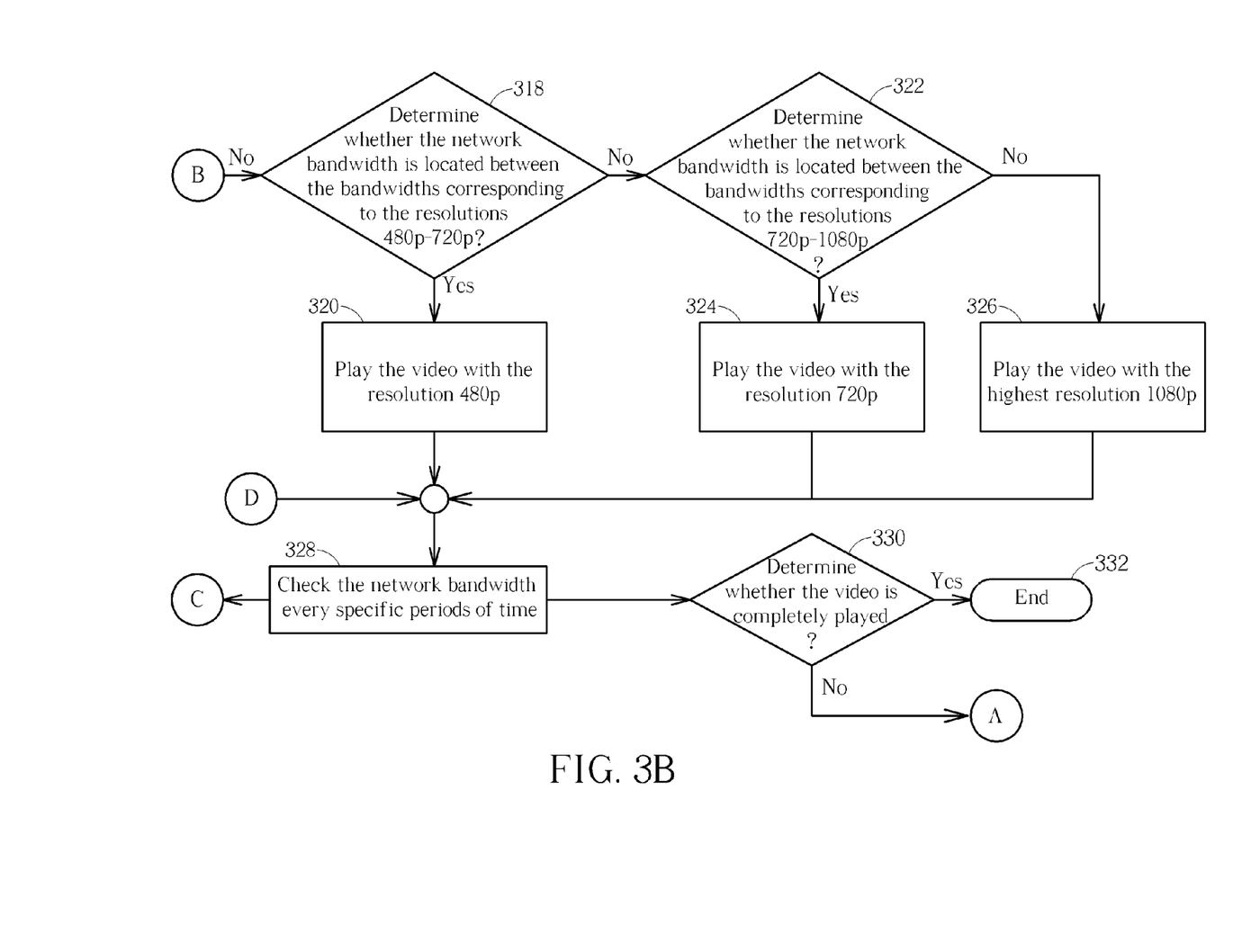

Take different types of internet videos as examples. For the live broadcasting videos of which programs have uncertain lengths, e.g. live broadcasting of a web TV station, internet broadcasting by relay, etc., the electronic device first plays a preview video with a smaller size and a lower resolution for 5 to 10 seconds. If the user still stays at the present channel, the video is then played in full screen with the maximum resolution according to the bandwidth. The processing of this type of programs is simpler since data associated with the live video cannot be downloaded in advance. Therefore, the main target of the program is to provide the highest quality supported by the bandwidth for the user and to be played without delay. The method of playing the live broadcasting video is detailed as follows. Please refer to FIG. 2, FIG. 3A, and FIG. 3B. FIG. 2 is a schematic diagram of the resolution of a YouTube video corresponding to the bandwidth according to an embodiment of the present disclosure, and FIG. 3A and FIG. 3B are schematic diagrams of a video playing process 30 of the live broadcasting video according to an embodiment of the present disclosure. Assume that the lowest resolution of the YouTube video is 360p and the highest resolution of the YouTube video is 1080p. As shown in FIG. 2, the required bandwidth for playing the YouTube video with the resolution 240p is 32 KB/s, with the resolution 360p is 64 KB/s, and with the resolution 480p is 128 KB/s . . . . In FIG. 3A, the electronic device first plays the preview video with the lowest resolution (Step 302). The electronic device then checks the network bandwidth (Step 304). In the embodiment of the present disclosure, if the network bandwidth is less than the bandwidth corresponding to the resolution 240p (i.e. 32 KB/s), the electronic device may play the video with the lowest resolution of the video 360p, and notify the user that the network speed is too slow or the video is delayed (Steps 306-308). If the network bandwidth is located between the bandwidths corresponding to the resolutions 240p-360p (i.e. 32 KB/s-64 KB/s), the electronic device may play the video with the resolution 240p (Steps 310-312). However, if the network bandwidth is not located between the bandwidths corresponding to the resolutions 240p-360p, the electronic device may keep determining whether the network bandwidth is located between the bandwidths corresponding to the resolutions 360p-480p. If yes, the electronic device may play the video with the resolution 360p (Steps 314-316). Otherwise, the electronic device may keep determining whether the network bandwidth is located between the bandwidths corresponding to the resolutions 480p-720p (Step 318). If the network bandwidth is located between the bandwidths corresponding to the resolutions 480p-720p, the electronic device may play the video with the resolution 480p (Step 320). However, if the network bandwidth is not located between the bandwidths corresponding to the resolutions 480p-720p, the electronic device may keep determining whether the network bandwidth is located between the bandwidths corresponding to the resolutions 720p-1080p (Step 322). If yes, the electronic device may play the video with the resolution 720p (Step 324). Please note that if the network bandwidth is greater than the bandwidth corresponding to the resolution 1080p (i.e. 550 KB/s), the electronic device may play the video with the highest resolution 1080p (Step 326). Please refer to FIG. 3B, where the electronic device checks the network bandwidth every specific periods of time (Step 328) and repeats the above steps (Steps 306-326) until the video is completely played.

For the general internet videos, video resources with fixed lengths are provided on websites, such as YouTube, Vimeo, etc. In this situation, the electronic device plays a preview video with a smaller size and a lower resolution for 5 to 10 seconds. If the user still stays at the present channel, the video is then played from the beginning in full screen with the maximum resolution according to the bandwidth. When playing the video, the electronic device utilizes a remaining bandwidth for downloading the video with the highest quality, which is provided for the user to utilize a limited bandwidth to watch a high quality video without delay. After sections of the high quality video has been downloaded enough as buffer data, the video is switched to be played with the high quality. The preview video and the high quality sections are stored in the electronic device, for preventing the electronic device from utilizing the network bandwidth for downloading the same sections when the user watches the video again, in order to utilize the bandwidth adequately for downloading the high quality data of the remaining sections.

Figure 7:
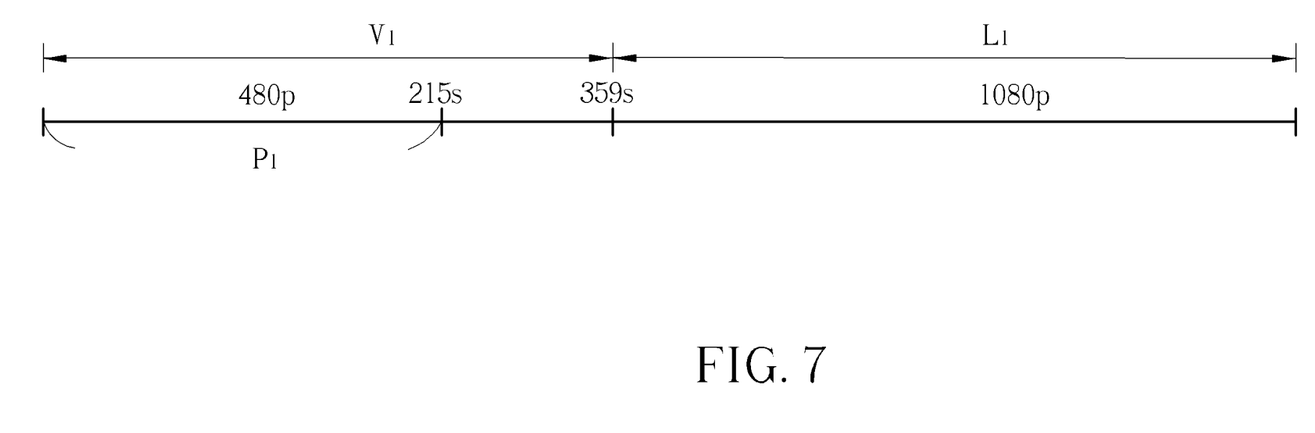
FIG. 7 is a schematic diagram of a playing phase according to another embodiment of the present disclosure.

Take a further example for realizing the video playing without delay. Please refer to FIG. 4, which is a schematic diagram of a playing phase according to an embodiment of the present disclosure. According to the embodiment of the present disclosure, a general internet video is divided into three playing phases $V_n$, $L_n$ and $L_B$. The playing phase $V_n$ denotes a length of time of the video data required to be downloaded from the network (unit: second). The playing phase $V_n$ can be divided into sections $P_1$-$P_3$. The section $P_1$ denotes a playing phase in which the video with the maximum resolution is played according to a current bandwidth, the section $P_2$ denotes a playing phase in which the highest resolution of the video is played (the buffer data downloaded during the phase $P_1$), and the section $P_3$ denotes a playing phase in which the highest resolution of the video is played (the buffer data downloaded by now). The playing phase $L_n$ denotes a length of time of the video data stored in the electronic device (unit: second). The playing phase $L_B$ denotes a length of time of the video data pre-downloaded by utilizing the current bandwidth when the video sections stored in the electronic device is played (unit: second). In FIG. 7, the electronic device plays a low quality video during the section $P_1$ of the playing phase $V_1$, and can utilize the remaining bandwidth for downloading the high quality video in advance and start to play the pre-downloaded high quality video in section $P_2$. If the electronic device has stored partial sections of the high quality video (e.g. the pre-downloaded high quality video when the video was played last time), the electronic device plays the stored sections of the video in the playing phase $L_1$ and utilizes the current bandwidth to pre-download the high quality video simultaneously (i.e. the playing phase $L_B$). When the playing phase $L_B$ is completely performed but the video is not completely played yet, the electronic device may repeat the above steps, i.e. utilize a lower resolution for playing the low quality video in the section $P_1$ of the playing phase $V_2$. The electronic device further utilizes the remaining bandwidth for pre-downloading the high quality video, and starts to play the pre-downloaded high quality video in the section $P_2$, and so on. Please note that, when the video is completely played (the playing phase $L_2$ in FIG. 7 is completely performed), since the video does not need to be downloaded from the network any longer, the electronic device can download preview videos and high quality data of other programs of the same program string in advance, and the next video of the string may have the highest priority.

Figure 4:
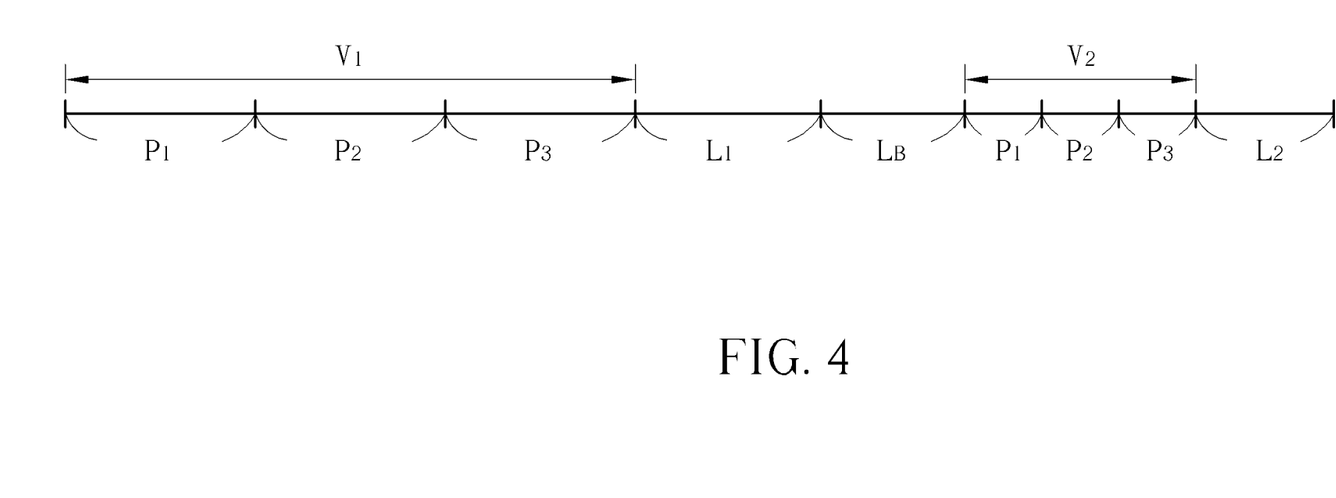
FIG. 4 is a schematic diagram of a playing phase according to an embodiment of the present disclosure.

The calculation for the section $P_1$ of the playing phase $V_n$ can be derived by the following formulas:

$T_1$=Highest*(Highest−Bandwidth);

$T_2$=(Bandwidth−DataRate)*(Highest−Bandwidth);

$T_3$=(Bandwidth−DataRate)*Highest;

$T_L$=$T_1$+$T_2$+$T_3$;

$P1$=$V_n$*$T_1$/$T_L$;

wherein Bandwidth denotes the current bandwidth of the network, DataRate denotes the data speed corresponding to the highest resolution supported by the network bandwidth (unit: KB/s), and Highest denotes the data speed corresponding to the highest resolution of the video (unit: KB/s). In addition, the calculation for the playing phase $L_B$ can be derived by the following formulas:

$L_B$=Bandwidth*$L_n$/Highest−Bandwidth.

Figure 5A:
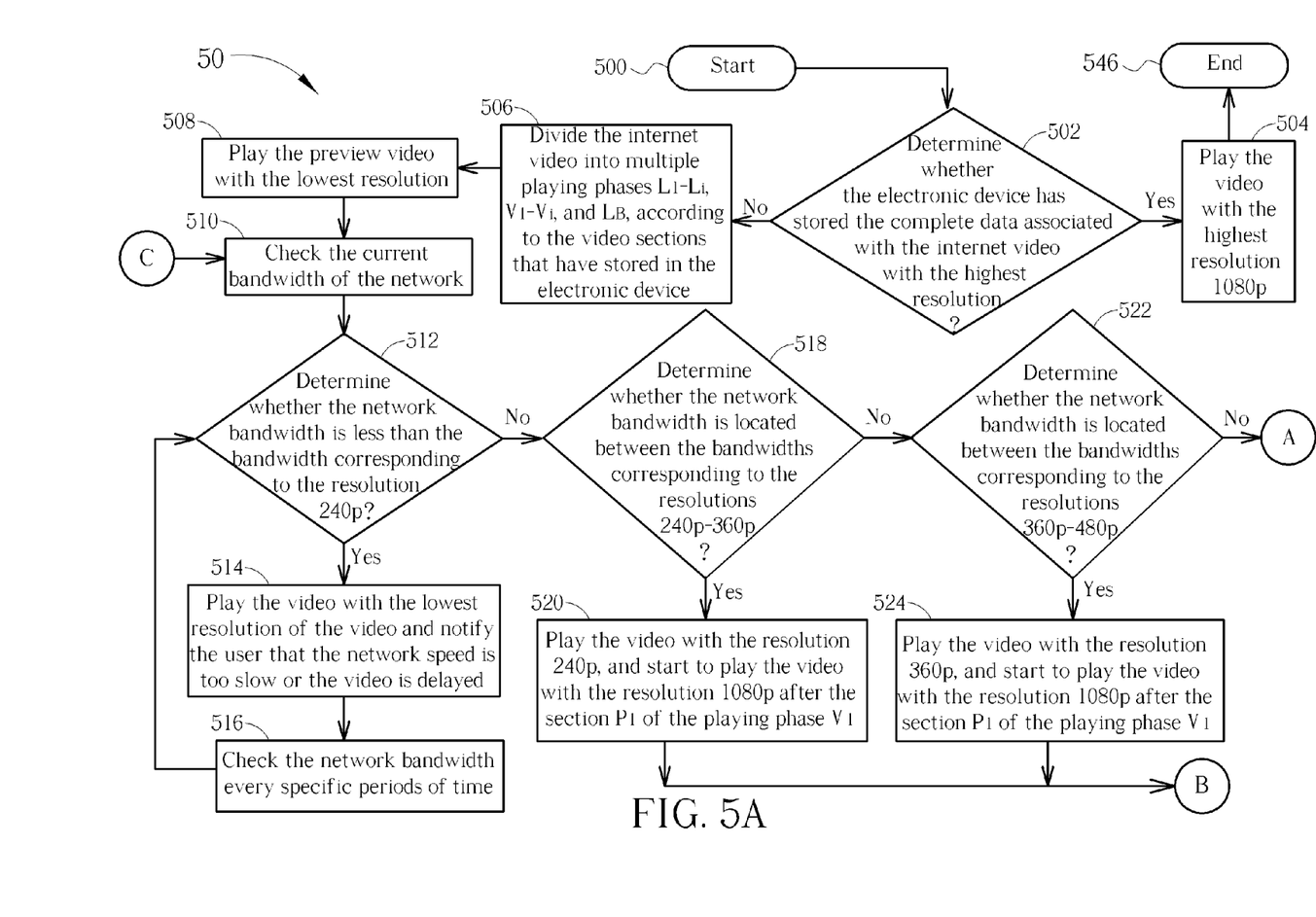
FIG. 5A and FIG. 5B are schematic diagrams of a video playing process of the general internet video according to an embodiment of the present disclosure.
Figure 5B:
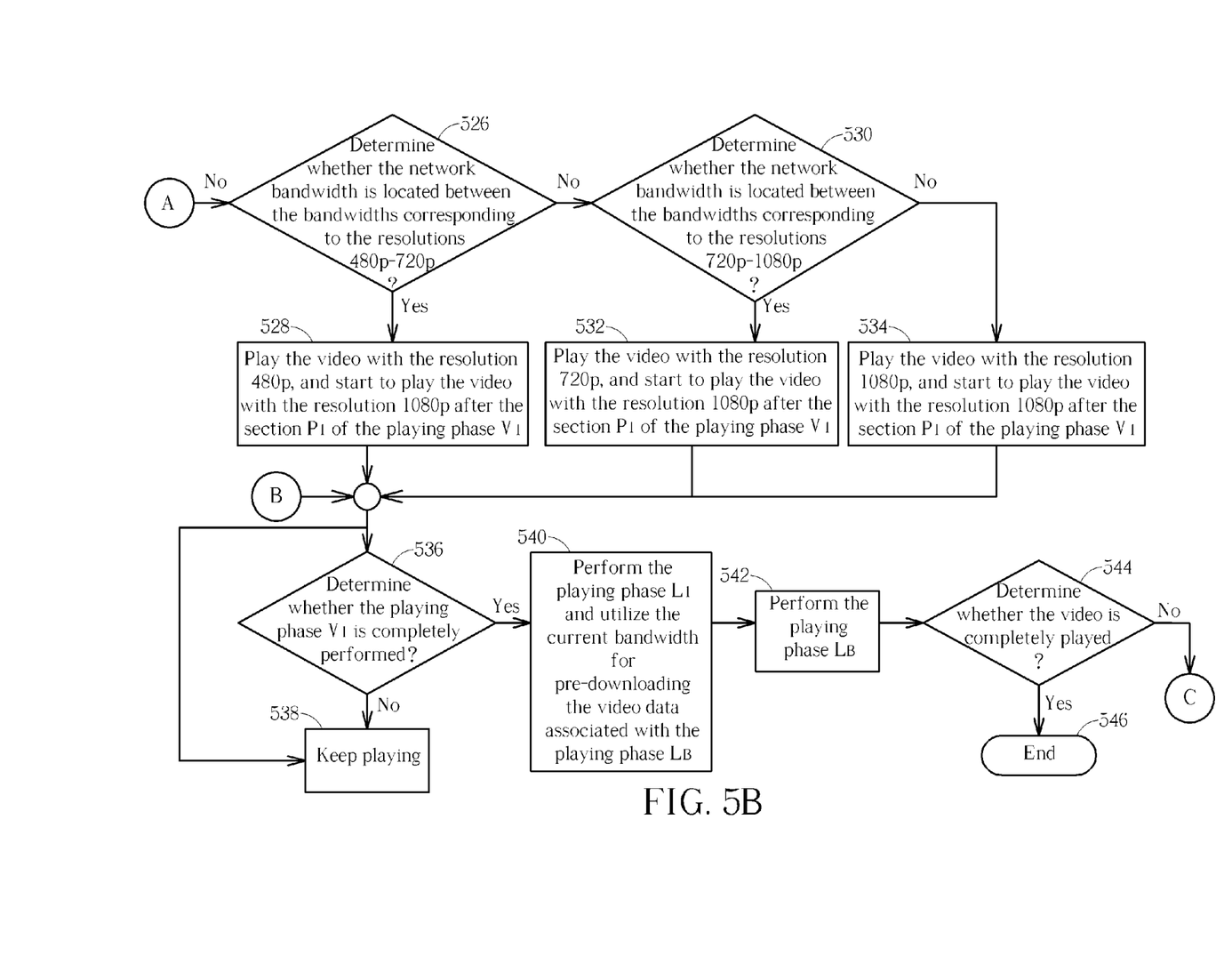

Please keep referring to FIG. 5A and FIG. 5B, which are schematic diagrams of a video playing process 50 of the general internet video according to an embodiment of the present disclosure. In FIG. 5A and FIG. 5B, the electronic device first determines whether it has stored the complete data associated with the internet video with the highest resolution (Step 502). If the electronic device has stored the complete data associated with the internet video with the highest resolution, the electronic device may play the video with the highest resolution 1080p directly (Step 504). If the electronic device has not stored the complete data associated with the internet video with the highest resolution, the electronic device may divide the internet video into multiple playing phases $L_1$-$L_i$, $V_1$-$V_i$, and $L_B$, according to the video sections that have stored in the electronic device (Step 506). The operations of each playing phase and the calculation of the lengths of time of each playing phase are illustrated above, and will not be narrated herein. The electronic device first utilizes the lowest resolution of the video for playing the preview video (Step 508), and checks the current bandwidth of the network (Step 510). If checking that the network bandwidth is less than the bandwidth corresponding to the resolution 240p (i.e. 32 KB/s), the electronic device may play the video with the lowest resolution 360p of the video and notify the user that the network speed is too slow or the video is delayed. The electronic device further checks the network bandwidth every periods of time (Steps 512-516). In contrary, if checking that the network bandwidth is greater than the bandwidth corresponding to the resolution 240p (i.e. 32 KB/s), the electronic device further determines whether the network bandwidth is located between the bandwidths corresponding to the resolutions 240p-360p (i.e. 32 KB/s-64 KB/s), the bandwidths corresponding to the resolutions 360p-480p (i.e. 64 KB/s-128 KB/s), and so on, and enters the playing phase $V_1$ according to the determined range of the network bandwidth. For example, if the determined range of the network bandwidth is located between the bandwidths corresponding to the resolutions 240p-360p (i.e. 32 KB/s-64 KB/s), the video may be played with the resolution 240p in the section $P_1$ of the playing phase $V_1$, if the determined range of the network bandwidth is located between the bandwidths corresponding to the resolutions 360p-480p (i.e. 64 KB/s-128 KB/s), the video may be played with the resolution 360p in the section $P_1$ of the playing phase $V_1$, and so on. The electronic device plays the video with the lower resolution in the section $P_1$ of the playing phase $V_1$, in order to pre-download the video data with the highest resolution 1080p with the remaining bandwidth (Steps 522-524), and starts to play the high quality video after the section $P_1$ of the playing phase $V_1$ (i.e. after $V_1*T_1/T_L$ seconds). In addition, the electronic device determines whether the playing phase $V_1$ is completely performed, in order to determine whether to keep performing the playing phase $V_1$ (Steps 536-538). When determining that the playing phase $V_1$ is completely performed, the electronic device may perform the playing phase $L_1$ (i.e. play the video sections stored in the electronic device), and utilize the current bandwidth for pre-downloading the video data (i.e. the video data associated with the playing phase $L_B$) during the playing phase $L_1$ (Step 540), in order to perform the playing phase $L_B$ after the playing phase $L_1$ is completely performed. When the playing phase $L_B$ is completely performed, the electronic device determines whether the video is completely played. If the video is completely played, the video playing process ends (Steps 542-544). If the video is not completely played yet, the electronic device may check the network bandwidth again, and enter the playing phase $V_2$ according to the determined range of the network bandwidth, i.e. repeat Steps 510-542.

Figure 6:
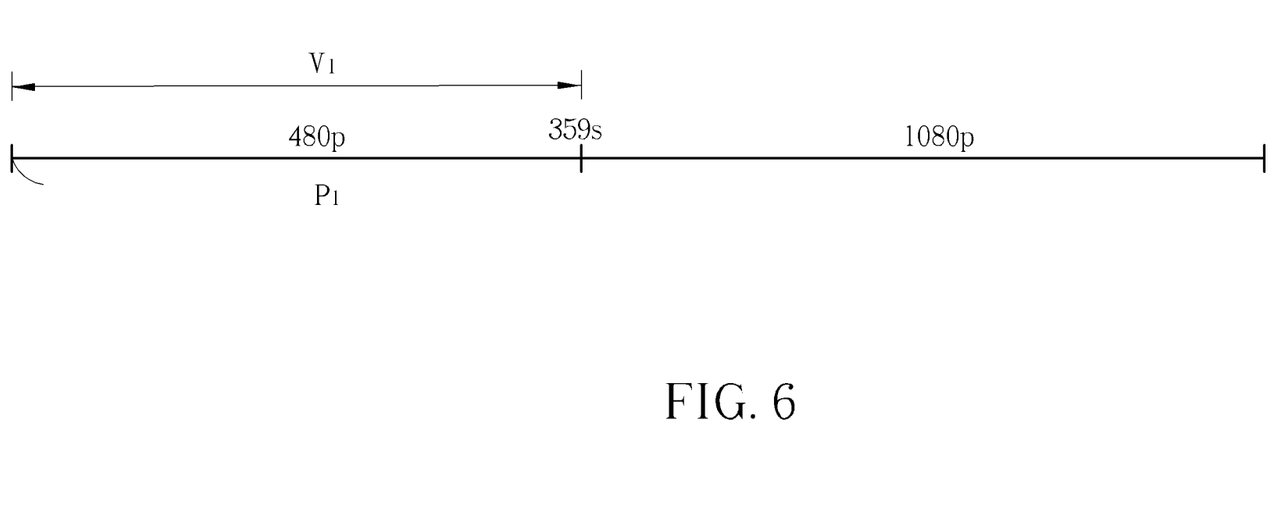
FIG. 6 is a schematic diagram of a playing phase according to an embodiment of the present disclosure.

Take a YouTube video as an example, and please refer to FIG. 2, FIG. 4, and FIG. 6 simultaneously, wherein FIG. 6 is a schematic diagram of a playing phase according to an embodiment of the present disclosure. The electronic device utilizes the network bandwidth 256 KB/s to watch a YouTube video with 600 seconds, and the lowest resolution of the video is 360p and the highest resolution of the video is 1080p. According to the embodiment of the present disclosure, the electronic device first utilizes the lowest resolution 360p for playing a preview video for 10 seconds when playing this YouTube video for the first time. Since the bandwidth utilized by the electronic device is 256 KB/s, the resolution corresponding to the bandwidth is located between 480p and 720p based on the conversion table of the resolution and the bandwidth illustrated in FIG. 2. The electronic device therefore starts to play in full screen with the resolution 480p in the section $P_1$ of the playing phase $V_1$. Since this YouTube video is played for the first time, the electronic device needs to process complete sections of the internet video with 600 seconds. According to the above formulas for calculating the length of time of the section $P_1$ of the playing phase $V_n$, the length of time of the section $P_1$ of the playing phase $V_1$ can be obtained as 359 seconds, that is, the electronic device may start to utilize the resolution 1080p for playing the YouTube video at the 359$^{th}$ second. The detailed calculation is narrated herein: the video section required to be processed by the electronic device has 600 seconds, the utilized network bandwidth is 256 KB/s (i.e. parameter Bandwidth), the bandwidth corresponding to the highest resolution of the video 1080p is 550 KB/s (i.e. parameter Highest), and the bandwidth corresponding to the maximum resolution of the video supported by the network bandwidth is 128 KB/s (i.e. parameter DataRate). These parameters are substituted in the above formulas and the length of time of the section $P_1$ of the playing phase $V_1$ is obtained as follows:

$$T_1=550*(550-256);$$

$$T_2=(256-128)*(550-256);$$

$$T_3=(256-128)*550;$$

$$T_L=T_1+T_2+T_3;$$

$$P_1=V_1*T_1/T_L=600*T_1/T_L=359.$$

As can be seen, 241 second (40%) high quality video with the resolution 1080p can be watched through the electronic device without delay when the network bandwidth is 256 KB/s according to the embodiment of the present disclosure, wherein the video needs to be downloaded with double the network bandwidth.

Please refer to FIG. 7, which is a schematic diagram of a playing phase according to another embodiment of the present disclosure. When playing the YouTube video for the second time, the electronic device first plays the preview video for 10 seconds with the resolution 360p. Since the bandwidth is 256 KB/s, which corresponds to the resolution between 480p and 720p, the electronic device uses resolution 480p to play the YouTube video with full screen. Besides, since the electronic device has stored the section after the 359$^{th}$ second of the high quality video, the electronic device only needs to process the section before the 359$^{th}$ second of the internet video. Therefore, when playing the YouTube video for the second time, the electronic device uses the resolution 480p to play the section $P_1$ of the playing phase $V_1$ of the second playing with full screen. According to the above formulas for calculating the length of time of the section $P_1$, the electronic device may start to utilize the resolution 1080p for playing the YouTube video at the 215$^{th}$ second. The detailed calculation is narrated herein: the video section required to be processed by the electronic device has 359 seconds, the utilized network bandwidth is 256 KB/s, the bandwidth corresponding to the highest resolution of the video 1080p is 550 KB/s, and the bandwidth corresponding to the maximum resolution of the video supported by the network bandwidth is 128 KB/s. These parameters are substituted in the above formulas and the length of time of the section $P_1$ is obtained as follows:

$$T_1=550*(550-256);$$

$$T_2=(256-128)*(550-256);$$

$$T_3=(256-128)*550;$$

$$T_L=T_1+T_2+T_3;$$

$$P_1=V_1*T_1/T_L=359*T_1/T_L=215.$$

As can be seen, when the video is played for the second time, the electronic device can start to play the data associated with the high quality video with the resolution 1080p at the 215$^{th}$ second. Therefore, the use can watch 65% (385 seconds) high quality video without delay with the same network bandwidth.

Please note that sometimes the user may switch to another channel after the electronic device utilizes the remaining bandwidth for pre-downloading the high quality video with the resolution 1080p for 10 seconds in the first playing, i.e. the electronic device only pre-downloads the section from the 359$^{th}$ second to the 369$^{th}$ second of the video in the first playing. In such a situation, when the video is played for the second time, the electronic device can utilize the current bandwidth for pre-downloading the last 8 second high quality video (i.e. as the playing phase $L_B$ illustrated in FIG.

4) when playing the data associated with the 10 second high quality video pre-downloaded in the first playing. The length of time of the pre-downloaded video can be derived according to the above formulas about the playing phase $L_B$. The detailed calculation is narrated herein: the pre-downloading time is 10 seconds, the utilized network bandwidth is 256 KB/s, and the bandwidth corresponding to the highest resolution 1080p of the video is 550 KB/s. These parameters are substituted in the above formulas and the length of time of the playing phase $L_B$ is obtained as follows:

$$L_B=256*10/550-256=8.$$

Figure 8:
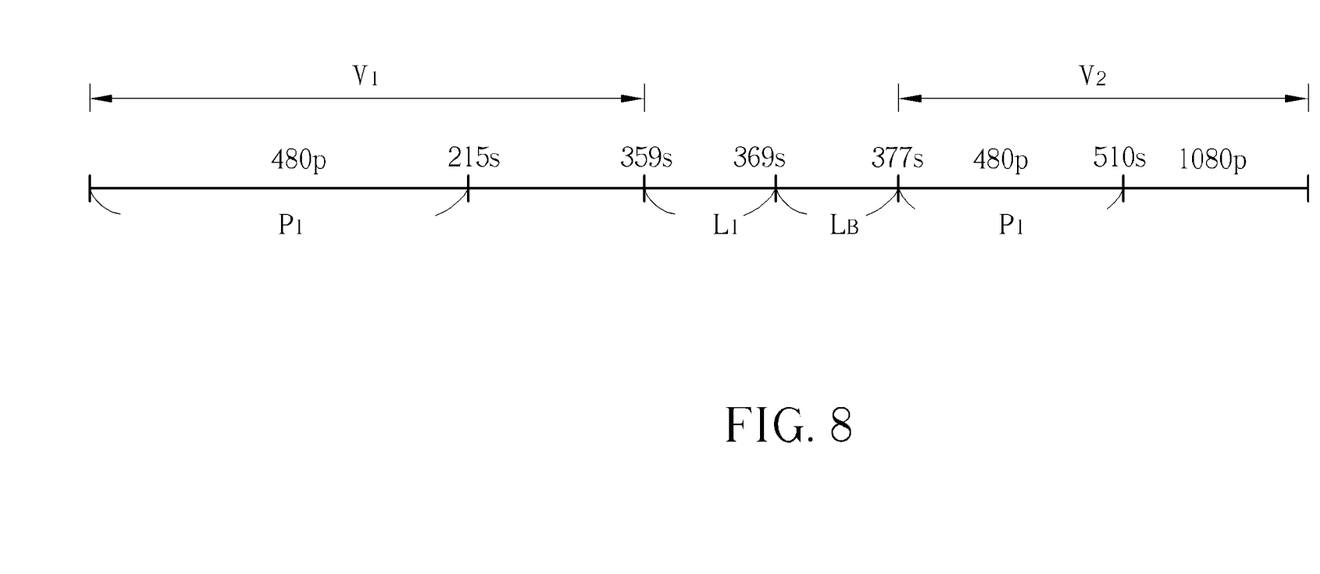
FIG. 8 is a schematic diagram of the second video playing according to an embodiment of the present disclosure.

The detailed playing conditions are illustrated in FIG. 8, which is a schematic diagram of the second video playing according to an embodiment of the present disclosure. In FIG. 8, the electronic device has stored the data associated with the high quality video from the $359^{th}$ second to the $369^{th}$ second. The electronic device can further download the data associated with the last 8 second high quality video when playing the section $359^{th}$-$369^{th}$ second of the video, such that the electronic device can still play the high quality video from the $369^{th}$ second to the $377^{th}$ second. However, there is still 223 second video data after the $377^{th}$ second (i.e. 600−377=223 seconds) not downloaded by the electronic device yet. Therefore, the electronic device may select a proper resolution for playing the video according to the network bandwidth again, i.e. start the playing phase $V_2$. According to the above formulas for calculating the length of time of the section $P_1$ of the playing phase $V_n$, the length of time of the section $P_1$ of the playing phase $V_2$ can be obtained as 133 seconds. The detailed calculation is narrated herein: the video section required to be processed by the electronic device has 223 seconds, the utilized network bandwidth is 256 KB/s, the bandwidth corresponding to the highest resolution of the video 1080p is 550 KB/s, and the bandwidth corresponding to the maximum resolution of the video supported by the network bandwidth is 128 KB/s. These parameters are substituted in the above formulas and the length of time of the section $P_1$ of the playing phase $V_2$ is obtained as follows:

$$T_1=550*(550-256);$$

$$T_2=(256-128)*(550-256);$$

$$T_3=(256-128)*550;$$

$$T_L=T_1+T_2+T_3;$$

$$P_1=V_2*T_1/T_L=223*T_1/T_L=133.$$

Therefore, the electronic device may utilize the resolution 480p for playing the video data from the $377^{th}$ second to the $377+133=510^{th}$ second, and utilize the resolution 1080p for playing the video data after the $510^{th}$ second. As can be seen, the user can still watch 251 second high quality video with the resolution 1080p among the whole video, and does not lose because tuning to another channel previously.

The embodiments of the present disclosure provide image displaying method. First of all, a preview video with a smaller size and a lower resolution is displayed. After a certain amount of video data is pre-downloaded, the displaying is advanced to full screen automatically, and from dim to clear gradually. The main purpose of the image displaying method is to grab the time for the electronic device to download the video data. In consideration of trade-off, the video without delay has a higher priority than high resolution images, in order to prevent the user from waiting for the video to be played. The method for achieving the above performance is that the electronic device should determine the optimized bandwidth for downloading the video, in order to select the most proper resolution for playing the video. The electronic device then utilizes the remaining bandwidth for pre-downloading the video data, to strive for continuity in the follow-up information stream. In addition, according to the embodiments of the present disclosure, the electronic device can memorize the channel with high utilization and set the channel to be a prior channel for pre-downloading.

Figure 9:
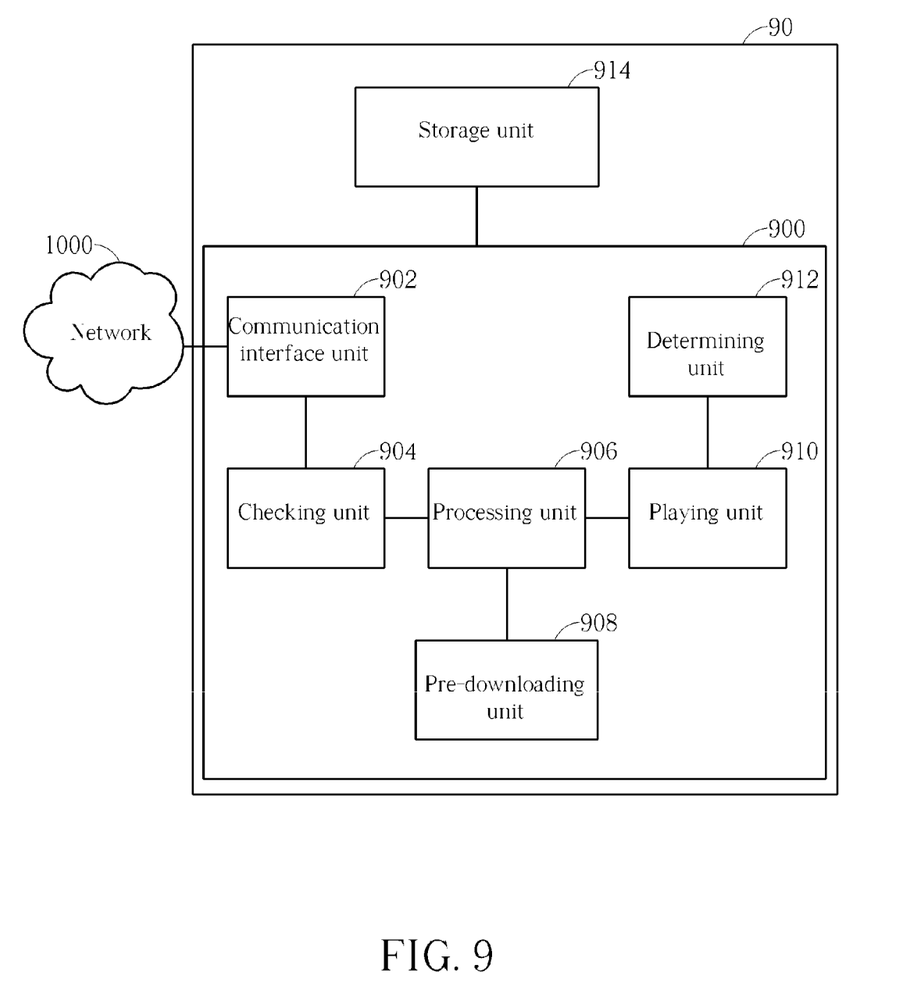
FIG. 9 is a schematic diagram of a video processing device according to an embodiment of the present disclosure.

Those skilled in the art can realize the video playing processes 10, 30, and 50 in a software manner or a hardware manner. For example, the electronic device includes a storage unit, which can be any one of data storage devices (e.g. read-only memory (ROM)) for storing data. The stored data includes a program which is compiled according the video playing process 10, wherein the program is read and processed by a processor to execute and realize the steps of the video playing processes 10, 30, and 50. In addition, please refer to FIG. 9, which is a schematic diagram of a video processing device 900 according to an embodiment of the present disclosure. The video processing device 900 can be utilized in the abovementioned electronic device such as web TV, computer, mobile phone, etc. As shown in FIG. 9, the electronic device 90 includes a video processing device 900 and a storage unit 914. The video processing device 900 includes a communication interface unit 902, a checking unit 904, a processing unit 906, a pre-downloading unit 908, a playing unit 910, and a determining unit 912. The communication interface unit 902 is utilized for receiving data associated with an internet video from a network 1000, wherein the video data includes information of a highest resolution and a lower resolution of the internet video. The checking unit 904 is utilized for determining a display resolution range according to a network bandwidth utilized by the communication interface unit 902 of the electronic device 90. The processing unit 906 is utilized for selecting a resolution for playing the internet video according to the display resolution range and whether the storage unit 914 of the electronic device 90 has stored a complete data associated with the internet video with the highest resolution. In detail, when the storage unit 914 of the electronic device 90 has stored the complete data associated with the internet video with the highest resolution, the processing unit 906 may select the highest resolution for playing the internet video; when the storage unit 914 of the electronic device 90 has not stored the complete data associated with the internet video with the highest resolution, the processing unit 906 may select a resolution value among the display resolution range for playing the internet video; and when a maximum resolution among the display resolution range is less than the lowest resolution, the processing unit 906 may select the lowest resolution for playing the internet video. The pre-downloading unit 908 is utilized for utilizing a remaining bandwidth of the network for downloading the video data with the highest resolution in advance when the resolution value selected among the display resolution range by the processing unit 906 is less than the maximum resolution among the display resolution range. The playing unit 910 is utilized for utilizing the resolution value selected by the processing unit 906 or a specific size of the internet video for playing preview data associated with the internet video, and dividing the internet video into a plurality of playing phases. The method of dividing the playing phases is illustrated above, and will not be narrated herein. The determining unit 912 is utilized for determining whether each playing phase is completely performed. In detail, when determining a playing phase is not completely performed, the determining unit 912 may send a first control signal to the playing unit 910, in order for the playing unit 910 to keep playing the internet video with the playing phase; when determining the playing phase is completely performed, the determining unit 912 may send a second control signal to the playing unit 910, in order for the playing unit 910 to enter another playing phase. In addition, when determining a playing phase is not completely performed, the determining unit 912 may send a third control signal to the checking unit 904, in order for the checking unit 904 to check the display resolution range according to the network bandwidth utilized by the electronic device 90 once again. The detailed operations of the video processing device 900 are illustrated above, and will not be narrated herein.

To sum up, in order to provide a use experience like the conventional TV, and internet video with high resolution under limited bandwidth to the user, the embodiments of the present disclosure provide methods and devices for selecting the resolution for playing the internet video automatically according to the bandwidth, so as to utilize the remaining bandwidth to pre-download the internet video with high resolution by the storage unit to achieve the effects of video playing without delay and with high quality images. In detail, the embodiments of the present disclosure first determines which resolution the current bandwidth of the network suits for, to replace that the user selects the resolution for playing the video manually in the prior art, in order to prevent the discontinuity and waiting when playing the internet video, such that the user can watch the video with high resolution under limited bandwidth.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A method of playing an internet video for an electronic device, the method comprising:
   receiving data associated with an internet video from a network, wherein the data comprises information of a highest resolution and a lowest resolution of the internet video;
   determining a first display resolution range according to a network bandwidth utilized by the electronic device;
   selecting a first resolution for playing the internet video according to the first display resolution range and whether the electronic device has stored the complete internet video with the highest resolution;
   dividing the internet video into a plurality of playing phases with time duration according to a download state of the internet video, wherein the download state includes download, pre-download, and required to be download; and
   utilizing the first resolution for playing the internet video in a first playing phase of the plurality of playing phases, wherein the first resolution is the resolution value selected among the first display resolution range, and a length of time of the first playing phase is derived by:

$T_1 = \text{Highest} * (\text{Highest} - \text{Bandwidth})$;

$T_2 = (\text{Bandwidth} - \text{DataRate}) * (\text{Highest} - \text{Bandwidth})$;

$T_3 = (\text{Bandwidth} - \text{DataRate}) * \text{Highest}$;

$T_L = T_1 + T_2 + T_3$;

$P_1 = V_n * T_1 / T_L$;

wherein $V_n$ denotes a length of time for downloading the internet video of $n_{th}$ playing phase from the network (unit: second), $P_1$ denotes the length of time of the first playing phase (unit: second), Bandwidth denotes a current bandwidth of the network providing to the electronic device, DataRate denotes a data speed to which the highest resolution supported by the network bandwidth corresponds (unit: KB/s), and Highest denotes a data speed to which the highest resolution of the internet video corresponds (unit: KB/s).

2. The method of claim 1, wherein the process of selecting the first resolution for playing the internet video according to the first display resolution range and whether the electronic device has stored the complete internet video with the highest resolution comprises:
   selecting the highest resolution as the first resolution when the electronic device has stored the complete internet video with the highest resolution;
   selecting a resolution value among the first display resolution range as the first resolution when the electronic device has not stored the complete internet video with the highest resolution; and
   selecting the lowest resolution as the first resolution when a maximum resolution among the first display resolution range is less than the lowest resolution.

3. The method of claim 2, further comprising:
   utilizing a remaining bandwidth of the network for downloading the internet video with the highest resolution in advance when the resolution value selected among the first display resolution range is less than the maximum resolution among the first display resolution range.

4. The method of claim 1, wherein the plurality of playing phases comprise a first type of playing phase in which the internet video is downloaded from the network, a second type of playing phase in which the internet video is pre-downloaded and stored in the electronic device, and a third type of playing phase in which the electronic device utilizes the remaining bandwidth to download the internet video when the electronic device performs the second type of playing phase.

5. The method of claim 1, further comprising:
   determining whether the first playing phase is completely performed;
   utilizing the first resolution for keeping playing the internet video when determining the first playing phase is not completely performed; and
   utilizing a second resolution for playing the internet video with the highest resolution downloaded in advance in a second playing phase among the plurality of playing phases when determining the first playing phase is completely performed, wherein the second resolution is the highest resolution.

6. The method of claim 5, further comprising:
   determining whether the second playing phase is completely performed;
   determining a second display resolution range according to the network bandwidth utilized by the electronic device when determining the second playing phase is not completely performed; and
   selecting a third resolution for playing the internet video in the second playing phase according to the second display resolution range.

7. The method of claim 1, further comprising:
utilizing the lowest resolution or a specific size for playing a preview data associated with the internet video.

8. A video processing device for an electronic device capable of playing an internet video, the video processing device comprising:
a communication interface unit, for receiving data associated with an internet video from a network, wherein the data comprises information of a highest resolution and a lowest resolution of the internet video;
a checking unit, for determining a first display resolution range according to a network bandwidth utilized by the electronic device;
a processing unit, for selecting a first resolution for playing the internet video according to the first display resolution range and whether the electronic device has stored the complete internet video with the highest resolution; and
a playing unit, for dividing the internet video into a plurality of playing phases with time duration according to a download state of the internet video, wherein the download state includes download, pre-download and required to be download, and for utilizing the first resolution for playing the internet video in a first playing phase of the plurality of playing phases, wherein the first resolution is the resolution value selected among the first display resolution range, and a length of time of the first playing phase is derived by:

$$T_1 = \text{Highest} * (\text{Highest} - \text{Bandwidth});$$

$$T_2 = (\text{Bandwidth} - \text{DataRate}) * (\text{Highest} - \text{Bandwidth});$$

$$T_3 = (\text{Bandwidth} - \text{DataRate}) * \text{Highest};$$

$$T_L = T_1 + T_2 + T_3;$$

$$P_1 = V_n * T_1 / T_L;$$

wherein $V_n$ denotes a length of time for downloading the internet video of $n_{th}$ playing phase from the network (unit: second), $P_1$ denotes the length of time of the first playing phase (unit: second), Bandwidth denotes a current bandwidth of the network providing to the electronic device, DataRate denotes a data speed to which the highest resolution supported by the network bandwidth corresponds (unit: KB/s), and Highest denotes a data speed to which the highest resolution of the internet video corresponds (unit: KB/s).

9. The video processing device of claim 8, wherein the processing unit is further utilized for selecting the highest resolution as the first resolution when the electronic device has stored the complete internet video with the highest resolution; selecting a resolution value among the first display resolution range as the first resolution when the electronic device has not stored the complete internet video with the highest resolution; and selecting the lowest resolution as the first resolution when a maximum resolution among the first display resolution range is less than the lowest resolution.

10. The video processing device of claim 9, further comprising:
a pre-downloading unit, for utilizing a remaining bandwidth of the network for downloading the internet video with the highest resolution in advance when the resolution value selected among the first display resolution range is less than the maximum resolution among the first display resolution range.

11. The video processing device of claim 8, further comprising:
a determining unit, for determining whether the first playing phase is completely performed, sending a first control signal to the playing unit when determining the first playing phase is not completely performed in order for the playing unit to utilize the first resolution for keeping playing the internet video, and sending a second control signal to the playing unit when determining the first playing phase is completely performed in order for the playing unit to utilize a second resolution for playing the internet video with the highest resolution downloaded in advance in a second playing phase among the plurality of playing phases, wherein the second resolution is the highest resolution.

12. The video processing device of claim 11, wherein the determining unit is further utilized for determining whether the second playing phase is completely performed, sending a third control signal to the checking unit when determining the second playing phase is not completely performed in order for the checking unit to determine a second display resolution range according to the network bandwidth utilized by the electronic device when receiving the third control signal, and sending a fourth control signal to the processing unit in order for the processing unit to select a third resolution for playing the internet video in the second playing phase according to the second display resolution range when receiving the fourth control signal.

13. The video processing device of claim 8, wherein the playing unit is further utilized for utilizing the lowest resolution or a specific size for playing a preview data associated with the internet video.

14. An electronic device for playing an internet video, the electronic device comprising:
a storage unit, for storing video data; and
a video processing device, for processing the internet video in advance, the video processing device comprising:
a communication interface unit, for receiving data associated with an internet video from a network, wherein the data comprises information of a highest resolution and a lowest resolution of the internet video;
a checking unit, for determining a first display resolution range according to a network bandwidth utilized by the electronic device; and
a processing unit, for selecting a first resolution for playing the internet video according to the first display resolution range and whether the electronic device has stored the complete internet video with the highest resolution; and
a playing unit, for dividing the internet video into a plurality of playing phases with time duration according to a download state of the internet video, wherein the download state includes downloaded, pre-downloaded, and required to be download, and for utilizing the first resolution for playing the internet video in a first playing phase of the plurality of playing phases, wherein the first resolution is the resolution value selected among the first display resolution range, and a length of time of the first playing phase is derived by:

$$T_1 = \text{Highest} * (\text{Highest} - \text{Bandwidth});$$

$$T_2 = (\text{Bandwidth} - \text{DataRate}) * (\text{Highest} - \text{Bandwidth});$$

$T_3 = (\text{Bandwidth} - \text{DataRate}) * \text{Highest}$;

$T_L = T_1 + T_2 + T_3$;

$P_1 = V_n * T_1 / T_L$;

wherein $V_n$ denotes a length of time for downloading the internet video of $n_{th}$ playing phase from the network (unit: second), $P_1$ denotes the length of time of the first playing phase (unit: second), Bandwidth denotes a current bandwidth of the network providing to the electronic device, DataRate denotes a data speed to which the highest resolution supported by the network bandwidth corresponds (unit: KB/s), and Highest denotes a data speed to which the highest resolution of the internet video corresponds (unit: KB/s).

15. The electronic device of claim 14, wherein the processing unit is further utilized for selecting the highest resolution as the first resolution when the electronic device has stored the complete internet video with the highest resolution; selecting a resolution value among the first display resolution range as the first resolution when the electronic device has not stored the complete internet video with the highest resolution; and selecting the lowest resolution as the first resolution when a maximum resolution among the first display resolution range is less than the lowest resolution.

16. The electronic device of claim 15, further comprising:
a pre-downloading unit, for utilizing a remaining bandwidth of the network for downloading the internet video with the highest resolution in advance when the resolution value selected among the first display resolution range is less than the maximum resolution among the first display resolution range.

17. The electronic device of claim 14, further comprising:
a determining unit, for determining whether the first playing phase is completely performed, sending a first control signal to the playing unit when determining the first playing phase is not completely performed in order for the playing unit to utilize the first resolution for keeping playing the internet video, and sending a second control signal to the playing unit when determining the first playing phase is completely performed in order for the playing unit to utilize a second resolution for playing the internet video with the highest resolution downloaded in advance in a second playing phase among the plurality of playing phases, wherein the second resolution is the highest resolution.

18. The electronic device of claim 17, wherein the determining unit is further utilized for determining whether the second playing phase is completely performed, sending a third control signal to the checking unit when determining the second playing phase is not completely performed in order for the checking unit to determine a second display resolution range according to the network bandwidth utilized by the electronic device when receiving the third control signal, and sending a fourth control signal to the processing unit in order for the processing unit to select a third resolution for playing the internet video in the second playing phase according to the second display resolution range when receiving the fourth control signal.

19. The electronic device of claim 14, wherein the playing unit is further utilized for utilizing the lowest resolution or a specific size for playing a preview data associated with the internet video.

* * * * *